(12) United States Patent
Jakl et al.

(10) Patent No.: US 6,456,037 B1
(45) Date of Patent: Sep. 24, 2002

(54) BATTERY CHARGER AND METHOD TO RECALL LAST CHARGE STATE

(75) Inventors: Daniel J. Jakl; William C. Bohne, both of Lawrenceville; Bradley E. Long, Lilburn, all of GA (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/908,448

(22) Filed: Jul. 18, 2001

(51) Int. Cl.⁷ ............................................. H01M 10/44
(52) U.S. Cl. ...................................... 320/106; 320/133
(58) Field of Search ................................ 320/106, 110, 320/112, 113, 114, 115, 128, 133, 134, 136, 137, 155

(56) References Cited

U.S. PATENT DOCUMENTS

| | | |
|---|---|---|
| 5,150,031 A | 9/1992 | James et al. |
| 5,568,037 A | 10/1996 | Massaroni et al. |
| 5,633,573 A | 5/1997 | van Phuoc et al. |
| 5,912,544 A * | 6/1999 | Miyakawa et al. ......... 320/106 |
| 6,175,211 B1 | 1/2001 | Brotto |
| 6,252,380 B1 | 6/2001 | Koenck |

* cited by examiner

*Primary Examiner*—Edward H. Tso
(74) *Attorney, Agent, or Firm*—Philip H. Burrus, IV

(57) ABSTRACT

This invention includes a method that allows a charger to quickly identify a battery pack. Once the battery pack has been identified, the invention allows the charger to determine whether prior charging processes should be resumed, or whether the charging cycle should be started anew. In one preferred embodiment, the battery includes a memory device having a unique identifier like a serial number, for instance. When the battery is coupled to the charger, the charger identifies the battery and queries the charger memory. If the battery has been disconnected from the charger for more than a predetermined amount of time, the charger presumes the battery has been depleted and starts the charging cycle from the beginning. If the battery has been disconnected for a short period of time, the charger presumes that the battery has not been greatly depleted and begins the previous charging process that was running when the battery was disconnected from the charger.

6 Claims, 2 Drawing Sheets

BATTERY CHARGER AND METHOD TO RECALL LAST CHARGE STATE

BACKGROUND

1. Technical Field

This invention relates generally to battery chargers, and more specifically to smart chargers having capabilities to identify batteries and to charge them accordingly.

2. Background Art

Portable devices routinely depend upon batteries as a power source. To reduce battery replacement costs, rechargeable batteries have found wide utility in powering contemporary consumer and business products. For example, both nickel- and lithium-based batteries may be repeatedly used to energize computers, radios, pagers, phones and other such devices.

Manufacturers have developed many devices for charging batteries. Some of these chargers are in the form of desk-top stands, where the user can leave the stand plugged in all the time and charge the battery simply by placing the device in the stand. The stand thus serves a dual function: first it acts as a charger, and second it acts as a mechanical holder for the electronic device. A problem with chargers of this type is that they can overcharge batteries, thereby compromising battery performance and cycle life.

For example, imagine a person with a two-way radio sitting in a desk-stand charger. If the person wants to transmit a message, he takes the radio out of the stand, presses the "talk" button and sends his message. Once he has finished transmitting, a process that may take a matter of seconds, the person will typically reinsert the radio back into the stand. After all, if the person doesn't want the radio lying about haphazardly on the desk, the stand provides a tidy and stable holder for the radio.

The problem with this "take out; use for a short time; reinsert" method is that nickel-based batteries can be overcharged. Typical nickel-based battery chargers have at least two modes: rapid charge and trickle charge. When a dead battery is inserted into a charger, the charger wants to charge the battery as fast as possible, so the charger blasts the battery with a high current. This is known as rapid charge. Once the battery "fills up", the charger detects a rapid rise in temperature—due to cell impedance increasing—and the charger switches to a very low current. The low current, which is just enough to keep the battery topped off, is known as "trickle" charge.

When a person takes a fully charged battery out of the charger and uses it for a brief period of time and reinserts it into the charger, the charger has no way of knowing that the battery is nearly fully charged. As a result, the charger blasts the battery in rapid charge mode until it detects a temperature rise. As there is a time delay with the temperature rise, the battery gets ever so slightly over charged. When the process is repeated numerous times, battery reliability is compromised.

Prior art solutions have attempted to solve this problem. For example, U.S. Pat. No. 5,175,211, issued to Brotto, teaches a means of identifying a battery via a resistor identifier or a microprocessor. The problem with the prior art is that it merely identifies the battery type, e.g. "This is a lithium battery"; or "This is a 1 Amp-hour, prismatic, Sony, cell." The prior art solutions do not identify the status of charge to avoid overcharging.

There is thus a need for an improved battery identification system.

DETAILED DESCRIPTION OF THE INVENTION

Figure 1:
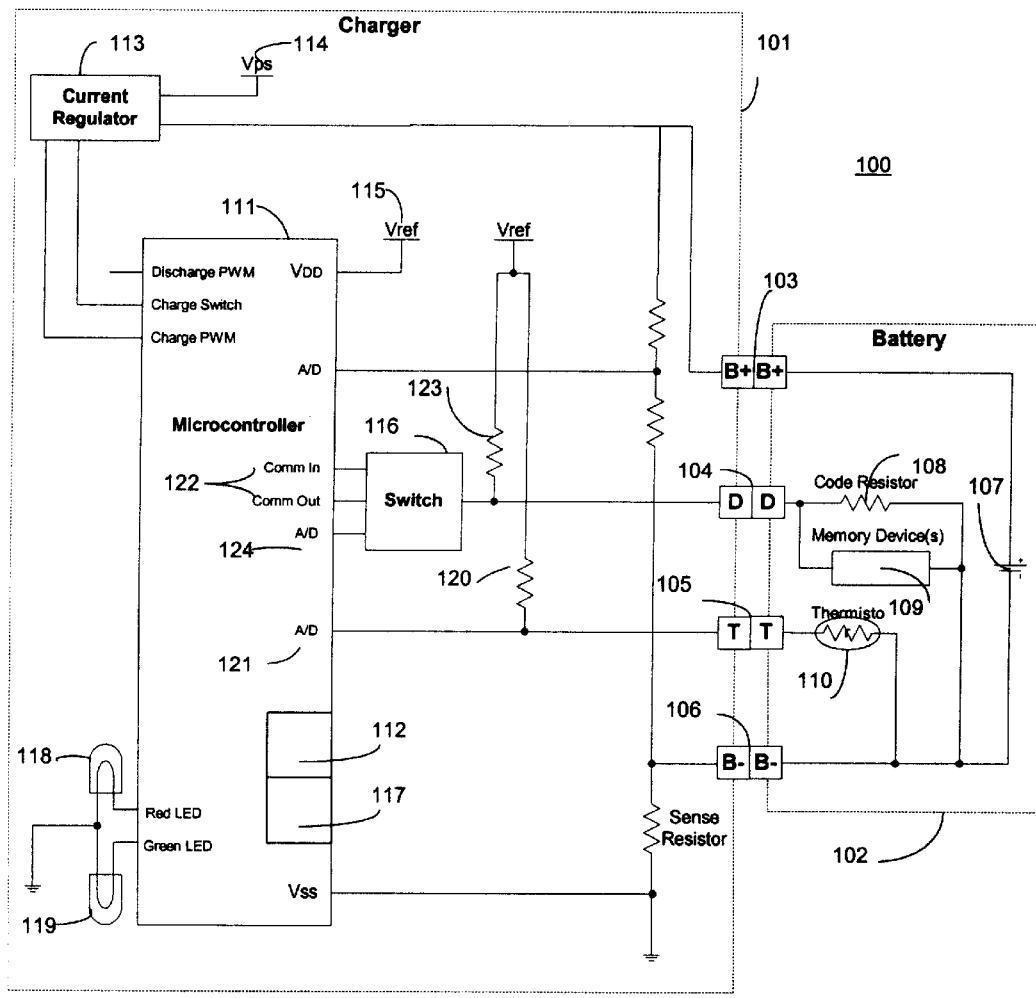
FIG. 1 is a schematic block diagram of a charging and battery apparatus in accordance with a preferred embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention includes firmware to be executed by a microprocessor in a battery charger. The invention is flexible and can be expanded to accommodate new processes and features. In its basic form, the invention includes a charger having a microprocessor with associated memory. The charger accommodates a battery having a unique identifying characteristic like a serial number, for example. When the battery is inserted into the charger, the charger reads the identifying characteristic and queries the charger memory to see if the battery has been in the charger before.

If the battery has been in the charger before, the charger determines how much time has elapsed since the battery was last charged. If more than a predetermined amount of time has elapsed, the charger will reinitialize the charging procedure. If, however, the battery has been disconnected from the charger for only a short time, the charger will return to the charging state where it left off with that particular battery.

For example, it is known that nickel batteries may be charged in two stages, the first being a rapid charge of high current followed by a trickle charge of low current. For a 1 Amp-hour cell, a high current may be 800 mA or greater, while a low current may be on the order of 50 mA. If a battery has completely cycled through the rapid charge mode, thereby filling the battery to capacity, the charger will have switched to trickle charge. If a user removes the battery and attached accessory from the charger for 5 seconds, when the battery is reinserted the charger will recognize the battery and return to trickle mode. Since the battery has not been removed from the charger long enough to dissipate any substantial energy, there is no need to return the battery to rapid charge. In so doing, the charger prevents the battery from being repeatedly overcharged.

Referring now to FIG. 1, illustrated therein is a schematic block diagram in accordance with a preferred embodiment. The system 100 includes a charger 101 having a power supply 114 and a current regulator 113. Any number of charging circuits known in the art, including buck regulators, linear regulators, flyback regulators, boost regulators, or equivalent would suffice as the current regulator 113. The charger 101 also includes indicator light emitting diodes, LEDs, 118 and 119.

The charger 101 includes a microprocessor 111 and a voltage reference 115. The microprocessor 111 includes on-board real-time clock 117 and random-access memory, RAM, 112, although peripheral memory would also suffice. The microprocessor 111 includes communication ports 122 and analog-to-digital, A/D, converters 124. One example of a microprocessor suited for this application is the uPD78F0034 series manufactured by NEC. This is an 8-bit microprocessor with 32 Kbytes of on-board flash memory and 1024 bytes of high-speed on-board RAM.

The charger includes several contacts for coupling to a battery. Typically, four contacts would be provided: a B+contact 103 for supplying power to the battery, a B−contact 106 that serves as a return path, a T contact 105 for sensing temperature, and a D contact 104 for identifying the battery. Temperature sensing may be done with a thermistor 110 in the battery pack 102. Identification may be done via either a coding resistor 108 or a memory device 109.

The battery pack 102 contains the thermistor 110 for sensing the temperature of the cell 107, the optional code resistor 108, which has an impedance that corresponds to a particular cell, and a memory device 109 that holds battery information, including serial number, type of cell, charging instructions, charge usage histogram, date of manufacture, first date of use, and similar information. An example of such a memory device is the DS2400 and DS2500 series manufactured by Dallas Semiconductor. Batteries of this construction are also taught in copending application Ser. No. 09/738,090, filed Dec. 15, 2000, entitled "Method and Mechanism to Prevent Corruption of Data", which is incorporated herein by reference in its entirety for all purposes.

When the battery 102 is placed in the pocket, causing connections 103–106 to close, the thermistor 110 causes the voltage at a first analog to digital (A/D) input 121 to change from Vref to Vref/X, where X is determined by the voltage divider of the pull-up resistor 120 and the thermistor 110. When the first A/D input 121 senses this change, the microprocessor 111 knows that a battery has been inserted into the pocket.

After insertion, the microprocessor 111 identifies the battery 102. This can be done in a variety of ways. One method is to read the memory device 109 via the conmmunication ports 122, of the microprocessor 111. A second method is to determine the value of the coding resistor 108 by sensing the voltage formed by the resistor divider of pull-up resistor 123 and the code resister 108 through the second A/D input 124. Note that as some older batteries do not include memory devices, a switch 116 is included that performs a multiplexing function allowing the microprocessor 111 to switch between a data communication mode and an analog mode.

Once the battery pack 102 has been identified, the microprocessor 111 establishes a register in the RAM 112 with which to record information about that particular battery. The microprocessor 111 may record information including identifier characteristics, serial number, fuel gauging information, status of charge, voltage, current, temperature, usage data, time the battery has been decoupled from the charger, and the like.

When the battery 102 is removed from the charger 101, the microprocessor 111 is able to detect this as the input to the A/D 124 goes high due to the pull-up resistor 120. When this occurs, the microprocessor 111 sets a counter value in the memory register of the RAM 112 associated with the particular battery to zero. The firmware associated with the microprocessor 111 then uses the real-time clock 117 to increment the counter value periodically.

Once the battery 102 is reconnected to the charger 101, the microprocessor 111 again re-executes the identification sequence. Once the battery 102 has been identified, the charger 101 queries the RAM 112 to see if the battery 102 has been in the charger 101 before. If it has, the microprocessor 111 reads the counter value out of the RAM 112. If the counter value is greater than a predetermined amount, the charger 101 will send the battery 102 back into rapid charge. Rapid charge will continue until another mode of termination occurs. Other modes of termination known in the art include voltage cutoff, temperature cutoff, pressure cutoff, and $\Delta T/\Delta t$ termination.

Figure 2:
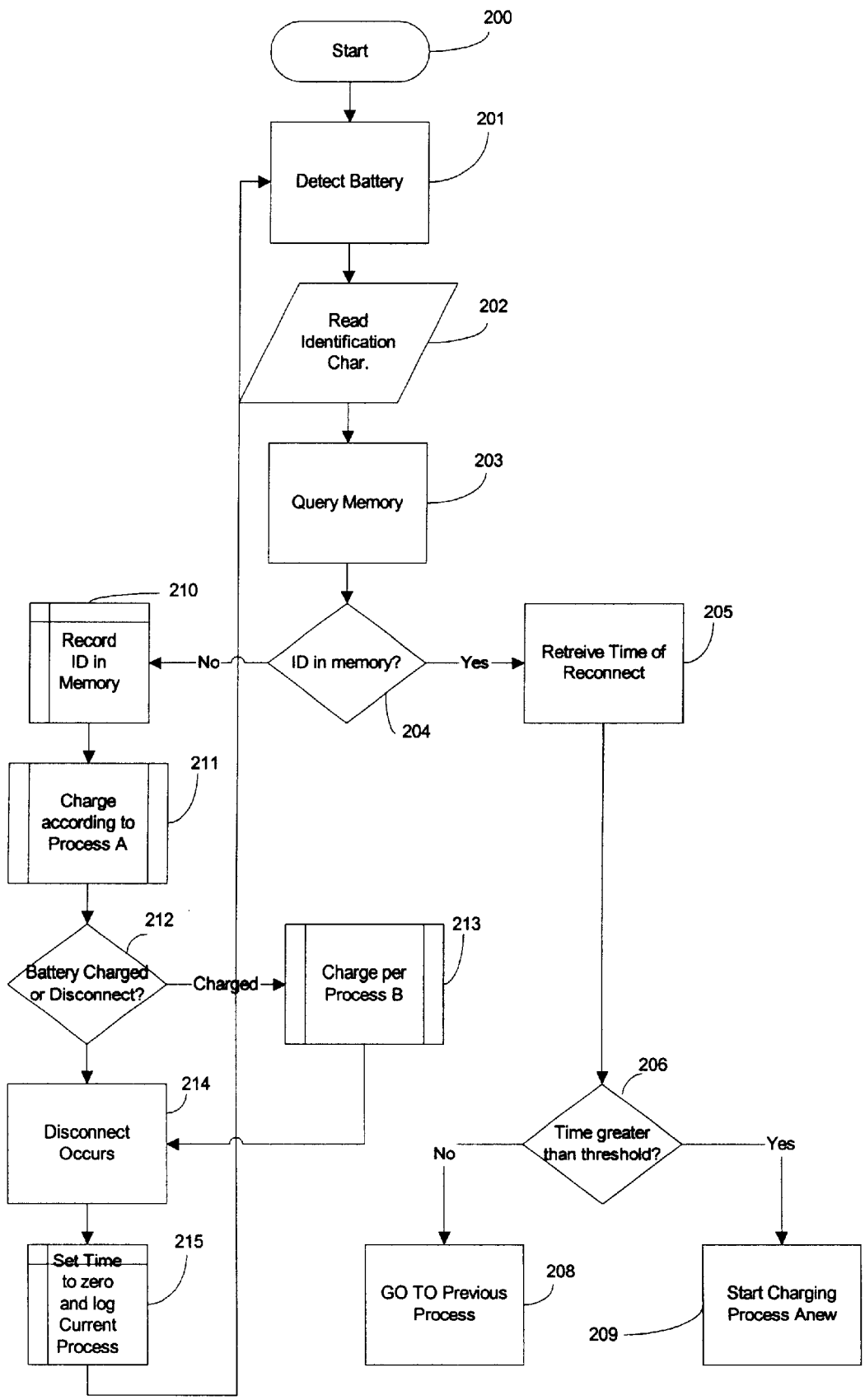
FIG. 2 is a flow chart depicting the firmware process in accordance with a preferred embodiment of the invention.

If the battery 102 has been decoupled from the charger 101 for less than a predetermined time, the charger 101 will take the battery 102 to the last stage of the charging cycle that the battery 102 saw. Thus, if the battery 102 was in a trickle mode, the charger 101 will resume the trickle mode. These steps. of this method are illustrated in the flow diagram of FIG. 2, elements 200–215.

The invention provides the ability to track the status of many batteries. As the LED indicators are often used as diagnostic tools, one need not worry about taking one battery out of the charger to test another. For example, if a first battery is in trickle charge mode indicated by a green LED, and a user wants to check the status of another battery, the user simply takes the first battery out of the charger and inserts the second. The second battery may cause a red LED to light indicating that the battery is in rapid charge mode, which implies that the battery is less than fully charged. When the user inserts the first battery again, the user is assured that the battery will re-enter trickle charge, as opposed to rapid charge with a risk of overcharge.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A method for charging a battery, the method comprising the steps of:
 a. providing a charger capable of identifying a battery, the charger comprising a microprocessor, a memory and a real-time clock;
 b. identifying the battery by retrieving an identifying characteristic;
 c. recording the identifying characteristic in the memory;
 d. commencing a charging process having at least one state; and
 e. recording the time at which the battery is decoupled with the charger.

2. The method of claim 1, further comprising the steps of:
 a. recording the time at which the battery is recoupled to the charger; and
 b. returning to an initial state of the charging process if the time at which the battery is recoupled to the charger, minus the time at which the battery is decoupled from the charger, exceeds a predetermined threshold.

3. The method of claim 2, further comprising the steps of:
 a. recording the state of the charging process operating when the battery is decoupled from the charger; and
 b. commencing the state of the charging process operating when the battery is decoupled from the charger if the time at which the battery is recoupled to the charger, minus the time at which the battery is decoupled from the charger, does not exceeds a predetermined threshold.

4. The method of claim 3, wherein the first process is selected from the group consisting of rapid charge and trickle charge.

5. The method of claim 4, wherein the first process is selected from the group consisting of rapid charge and trickle charge.

6. The method of claim 5, wherein the identifying characteristic is a serial number.

* * * * *